(12) United States Patent
Wang (10) Patent No.: US 11,370,336 B2
(45) Date of Patent: Jun. 28, 2022

(54) TRANSIT BENCH SEAT

(71) Applicant: Tian Yong Wang, Fitchburg, MA (US)

(72) Inventor: Tian Yong Wang, Fitchburg, MA (US)

( * ) Notice: Subject to any disclaimer, the term of this patent is extended or adjusted under 35 U.S.C. 154(b) by 523 days.

(21) Appl. No.: 16/593,119

(22) Filed: Oct. 4, 2019

(65) Prior Publication Data

US 2021/0101508 A1 Apr. 8, 2021

(51) Int. Cl.
*B60N 2/30* (2006.01)
*B60N 2/68* (2006.01)
*B60N 2/24* (2006.01)
*B60N 2/52* (2006.01)

(52) U.S. Cl.
CPC ............. *B60N 2/305* (2013.01); *B60N 2/68* (2013.01); *B60N 2/242* (2013.01); *B60N 2/522* (2013.01)

(58) Field of Classification Search
CPC .... B60N 2/305; B60N 2/3038; B60N 2/3045; B60N 2/68; B60N 2/242; B60N 2/522
USPC ...................................... 296/65.05
See application file for complete search history.

(56) References Cited

U.S. PATENT DOCUMENTS

| | | | | |
|---|---|---|---|---|
| 5,575,533 | A * | 11/1996 | Glance ................. | B60R 22/20 297/452.2 |
| 5,597,139 | A * | 1/1997 | Beroth ................ | B64D 11/0693 244/118.6 |
| 6,012,778 | A | 1/2000 | Schneider | |
| 7,377,582 | B2 | 5/2008 | Fukada | |
| 8,336,965 | B2 * | 12/2012 | Kismarton ......... | B64D 11/0649 297/232 |
| 8,360,496 | B2 * | 1/2013 | Farcas ................ | B60N 2/3065 296/65.09 |
| 10,035,433 | B2 | 7/2018 | Muraiti | |
| 10,376,062 | B2 | 8/2019 | Rivera, Jr. | |
| 2010/0207418 | A1 * | 8/2010 | Sayama ............... | B60N 2/3011 296/65.09 |
| 2010/0207422 | A1 * | 8/2010 | Sayama ............... | B60N 2/3031 296/66 |
| 2010/0231017 | A1 | 9/2010 | Adams | |
| 2013/0313849 | A1 * | 11/2013 | Ito ......................... | B60N 2/305 296/65.01 |
| 2018/0079333 | A1 | 3/2018 | Ma | |
| 2019/0060699 | A1 | 2/2019 | Frederick | |

FOREIGN PATENT DOCUMENTS

| | | |
|---|---|---|
| CN | 2715622 | 8/2005 |
| CN | 2806261 | 8/2006 |
| CN | 201646743 | 11/2010 |
| CN | 105922912 | 9/2016 |

* cited by examiner

Primary Examiner — Mark R Wendell
(74) Attorney, Agent, or Firm — Clement Cheng (57) ABSTRACT

A transit bench seat has a seat with a seat frame. The seat frame is connected to a folding frame that folds between an upright stowed position and a horizontal deployed position. A seat frame cover covers the left or right end of the seat frame. A plurality of rib sections are formed as frame ribs and can be segmented between a vertical fixed portion and a horizontal folding portion. The frame ribs include a first frame rib, a second frame rib, and third frame rib. The frame ribs are formed with a seat nose. The seat nose is supported at a seat nose frame bracket for stability of the frame rib and seat nose. A rear cross bar is placed below a top crossbar. The rear crossbar and the top crossbar are connected to the frame ribs.

3 Claims, 12 Drawing Sheets

TRANSIT BENCH SEAT

FIELD OF THE INVENTION

The present invention is in the field of transit bench seats.

DISCUSSION OF RELATED ART

A variety of different transit bench seats have been described in the prior art. For example, in the U.S. Pat. No. 6,012,776, Reversible Seat Back For A Bench Seat by inventor Ulrich Schneider, published Jan. 11, 2000 the abstract discloses, "A reversible back for a bench seat is disclosed, in particular a back for the rear seat of a vehicle, such that parts of the back can be folded down into a flat transport position and returned to an upright seat position individually and independently of one another. A middle seat-back part (10) is provided, which can selectively be folded down either together with one or both of the laterally adjacent, outer seat-back parts (12, 14) or by itself, independently of the two outer seat-back parts (12, 14), as desired. The middle seat-back part (10) can be locked to each of the two outer parts (12, 14) individually. A central actuating mechanism (20) is provided in the middle seat-back part (10) so that the locking mechanisms (16, 18) on the two sides thereof can be jointly and simultaneously disengaged or engaged."

For example, in the U.S. Pat. No. 10,376,062, Mobile Folding Restaurant Booth Style Bench by inventor Jeremias C Rivera, published Aug. 13, 2019 the abstract discloses, "Mobile folding restaurant booth style benches are provided, which may be arranged in opposed pairs to form restaurant style booths. An individual bench incorporates a mechanism for shifting the weight of the bench between a mobile base, which may be supported by swivel casters, and a stationary base, which may be supported by non-slip feet, actuated by pivoting a bench seat down from a folded storage position to an unfolded seating position. The weight shifting mechanism may include an engagement member, which is initially spaced apart from an actuator at a folded angle of the seat, and which contacts and begins transmitting force and movement to the actuator at a partially unfolded angle of the seat. Preferably, the bench further includes a biasing component that biases the stationary base upward relative to the mobile base."

For example, in the U.S. Pat. No. 7,377,582, Supporting Structure and Seat Apparatus Having A Retractable Seat by inventor Ryuta Fukada, published May 27, 2008 the abstract discloses, "A seat apparatus include: a shaft rotated by a motor and operatively associated with the seat so as to move the seat; a first leg secured to the shaft and pivotably supported by the seat; a first spring, one end of which is fixedly attached to the shaft and an other end of which is fixedly attached to the seat; the first spring which biases the shift in a first direction; and a second spring, one end of which is fixedly attached to the shaft and an other end of which is fixedly attached to the seat, the second spring which biases the shaft in a second direction. The first direction opposes to the second direction."

For example, in the U.S. Pat. No. 10,035,433 Frameless Transit Seat by inventor Vitaliy Viktorovich Muraiti, published Jul. 31, 2018 the abstract discloses, "A frameless transit seat is used for carrying passengers in a transit vehicle. The transit seat is comprised of at least two pedestals which connect the seating portion to the vehicle floor and which distribute the weight of the seat and its passenger(s). Under the passenger, at least two side supports are affixed on top of the pedestals, and one or more crossbars or stabilizers, without any rack frame structures connecting the pedestals. A variant of the transit seat has two seats and uses a mounting plate to connect the two inner side supports to a central pedestal. The components of the transit seat include hollow beams, bent sheet metal, and other components optimized to decrease mass while retaining maximum strength. Optionally, the seat may recline and be upholstered in a variety of covering options."

For example, in the United States publication number 2010/0231017, Seating by inventor Lea Mark Adams, published Sep. 16, 2010 the abstract discloses, "Seating (10), including a support member (14) for supporting a plurality of seats (12), the support member (14) being, in use, substantially horizontal, the seating (10) further including a plurality of seats (12) each of which includes a seat portion (16) and a backrest (18), the seat portion (16) of each seat (12) being pivotable relative to the respective backrest (18) between a first, tipped-up, position and a second, open, position, wherein when in the first position the seat portion (16) is substantially parallel to the backrest (18), and in the second position the seat portion (16) is substantially perpendicular to the backrest (18), the seat portion (16) being biased towards the first position, each seat (12) further including an attachment formation (24) in which an upper part of the support member (14) is receivable."

For example, in the United States publication number 2018/0079333, Seat Arrangement For A Vehicle by inventor Jianliang Ma, published Mar. 22, 2018 the abstract discloses, "A seat arrangement for a vehicle includes first and second mounting brackets configured for attachment to a vehicle body. A seat back frame is attached to the first mounting bracket and is pivotable relative to the first mounting bracket around a first pivot axis. A seat cushion frame is pivotably attached to the second mounting bracket, and attached to the seat back frame such that the seat cushion frame and the seat back frame are pivotable relative to each other around a second pivot axis positioned above the first pivot axis when the seat back frame is in a use position."

For example, in the United States publication number 2019/0060699, Vehicle Seat Assembly For Physical Exercise by inventor Scott L. Frederick, published Feb. 28, 2019 the abstract discloses, "A vehicle seat assembly includes a seat base, a seat back rotatably connected to the seat base, a seat bottom mounted on the seat base, and at least one of the following mounted to one of the seat base, seat back, and seat bottom: a resistance mechanism structured to exert a biasing force on at least one exercise arm operatively connected to the resistance mechanism; a bicycle seat receptacle structured for detachably mounting a bicycle seat to the seat base; and a docking mechanism structured for detachably mounting a pedal mechanism to the seat base."

For example, in the China patent number CN2715622Y, Folding Chair Having Damping Mechanism by inventor Zhao Yongdong, published Aug. 10, 2005 the abstract discloses, "The utility model relates to a folding chair having damping mechanism, which belongs to the chair technical field. The utility model comprises quadrilateral base frame which is provided with a main shaft for penetrating the two opposite sides of the base frame, the main shaft is sheathed with a torsion spring, the head end of the torsion spring is fixed with the base frame, and the back end of the torsion spring is relatively fixed with the main shaft. The middle part of the main shaft is fixed with a connecting rod, the base frame is fixed with a transverse beam, and a buffer which is vertical to the main shaft and has the function of single direction damping action is movably connected between the output end of the connecting rod and the transverse beam. The two ends of the main shaft is horizontally arranged on the vertical wall when using, the buffer can be quickly unlatched when pulling the chair down, and the chair can be pulled down by only overcoming the elastic force of the torsion spring. When people leave the chair, the torsion spring is reset with the buffer slowly moving, and therefore, the torsion spring cannot rapidly reset but only slowly reset, and the chair has no attacking and small noise when folding. The utility model can be used in vehicle, ship, waiting hall, theatre and stadium, etc."

For example, in the China patent number CN105922912A, Turnover Stool Capable Of Adjusting Turnover Speed by inventor Han Peng, published Sep. 7, 2016 the abstract discloses, "The invention relates to an article used in a train, a motor train unit, a vehicle, and a steamship, and especially relates to a turnover stool capable of adjusting turnover speed. The turnover stool comprises a back rest, a center shaft, a seat frame, a C-type connecting shaft block, a rear cover, and a limiting mechanism. Two ends of the center shaft are fixedly connected with the back rest. The rear part of the seat frame is rotatably connected with the center shaft. The inner arc surface of the C-type connecting shaft block is lined with a friction plate. The C-type connecting shaft block rotates relative to the center shaft with the seat frame. The rear cover is detachably connected with the seat frame. The turnover stool is long in life, and is not influenced by temperature and temperature difference, and safety is guaranteed. Various different turnover speed of the stool can be adjusted according to requirement of a client. The stool is simple in processing, convenient in manufacturing, convenient in operation, and easy in maintenance. The stool is suitable to be used in regions of different temperature differences, and does not have gas and liquid leakage, does not generate any pollution, and the seat frame is permitted to be made thin, and the stool is more beautiful and does not occupy space."

For example, in the China publication number CN201646743U, Turning Bench by inventor Zhao Ligui, published Nov. 24, 2010 the abstract discloses, "The utility model discloses a turning bench comprising a backrest and a seat, wherein the backrest comprises a left end plate and a right end plate; the seat comprises a seat frame, a fixed shaft, a left shaft seat, a right shaft seat, a left torsional spring, a right torsional spring and a damping oil cylinder; the left shaft seat and the right shaft seat are respectively fixed on the left end plate and the right end plate; the seat frame is arranged on the left shaft seat and the right shaft seat in a rotating manner; two ends of the fixed shaft are respectively fixed with the left shaft seat and the right shaft seat; a cylinder body and a piston rod of the damping oil cylinder are respectively fixed with the middle parts of the seat frame and the fixed shaft; the fixed point of the damping oil cylinder and the fixed shaft has 5-10 mm of eccentricity from the axis of the fixed shaft; and a left coil spring and a right coil spring are respectively sheathed on the fixed shaft, and two free ends thereof are respectively fixed with the seat frame and the fixed shaft. In the use of the utility model, the damping oil cylinder can apply uniform resistance on the left torsional spring and the right torsional spring, thus leading the seat to be turned upward uniformly, reducing the bounced speed of the seat, and also avoiding the generating of noise when the seat is turned."

For example, in the China patent number CN2806261Y, Tunable Seat For Train by inventor Liu Yuhua, published Aug. 16, 2006 the abstract discloses, "The utility model relates to a tunable bench for passenger trains, which can be automatically turned up. In order to solve the technical problems existing in the prior art that the sides of a revolving pair which is arranged between a shaft and a framework are easily ground when the benches are turned, which leads to the easy damage of the bench; passengers are hit when the benches are turned upwards, etc., the utility model comprises a framework for a bottom seat, a cross beam for the bottom seat and a crank shaft which is arranged on the framework for a bottom seat. The utility model is characterized in that the middle of the crank shaft is connected with a pneumatic support rod and a connecting rod, the other end of the connecting rod is inserted in a slide hole of the cross beam for the bottom seat and the other end of the pneumatic support rod is connected with the connecting rod. Due to the support function of the pneumatic support rod which is provided with a damper, the connecting rod can rotate, so the tunable bench rotates relative to the shaft and the tunable bench can be automatically restored to vertical state without external force. Due to the continuous damping function of the pneumatic support rod which is provided with the damper, the connecting rod rotates slowly, so the tunable bench is slowly restored to the vertical state without impact in the whole process and the passengers can not be beaten."

SUMMARY OF THE INVENTION

A transit bench seat comprising a seat with a seat frame. The seat frame is connected to a folding frame that folds between an upright stowed position and a horizontal deployed position. A seat frame cover covers the left or right end of the seat frame. A plurality of rib sections are formed as frame ribs and can be segmented between a vertical fixed portion and a horizontal folding portion. The frame ribs include a first frame rib, a second frame rib, and third frame rib. The frame ribs are formed with a seat nose. The seat nose is supported at a seat nose frame bracket for stability of the frame rib and seat nose. A rear cross bar is placed below a top crossbar. The rear crossbar and the top crossbar are connected to the frame ribs. A pair of torsion springs include a right torsion spring and a left torsion spring that are helically mounted around a torsion bar. The torsion bar is rotationally mounted to the seat frame.

A torsion arm is rigidly connected to the torsion bar. The torsion arm extends away from the torsion bar. The torsion bar has a torsion bar anchor. The pair of torsion spring are mounted to the torsion bar at the torsion bar anchor. A shock is pivotally connected to the torsion arm, and pivotally connected to the folding frame. The shock is mounted at an inner shock pivot to the torsion arm. The shock is mounted to the folding frame at an outer shock pivot. The seat can be configured to automatically fold to the upright stowed position when unoccupied.

The transit bench seat optionally has folding module connectors that connect the folding frame to the seat frame. The folding frame is thus modularly detachable. The shock is a telescopic member that dampens movement. The shock can be hydraulic or pneumatic. The shock dampens the force of the right torsion spring and the left torsion spring helically mounted around the torsion bar. The right torsion spring mount and the left torsion spring mount mount the extending tips of the torsion springs. The outer shock pivot pivotally connects the shock to the seat frame and the inner shock pivot pivotally connects the shop to the torsion bar. The folding module connectors connect the mounting plate to the mounting recess. The mounting recess on the seat frame has a cover angle slot which receives an angle pin of the mounting plate. The cover angle slot on the seat frame matches an angle limiting slot on the mounting plate, so that the angle pin travels through both the cover angle slot and the angle limiting slot to limit a travel angle of the folding frame between the upright and the deployed position.

It is an object of the present invention to improve the structure of the transit bench seat in strength, weight, ease of installation, and ease of maintenance.

The following call out list of elements can be a useful guide for referencing the element numbers of the drawings.

20 seat
21 seat frame
22 seat frame flange
23 seat end cover
24 seat nose
25 seat nose frame support
26 seat nose frame bracket
27 seat nose flange
28 front cross bar
29 rear cross bar
30 rib section
31 top cross
32 top cross bar flange
33 crossbar hollow
34 first frame rib
35 second frame rib
36 third frame rib
37 fourth frame rib
38 frame mounting tab opening
39 mid connector tab
40 frame connection extension
41 lower seat frame mounting tab
42 upper seat frame mounting tab
43 seat end cover mounting tab
44 wall bracket
45 wall bracket notch
46 cross bar tab
47 seat rib panel
48 seat back rib panel
49 seat corner
50 upper reinforcement area
52 lower frame tab webbing
60 folding module
61 shock
62 right torsion spring
63 left torsion spring
64 torsion bar
65 shock arm
66 right torsion spring mount
67 left torsion spring mount
68 outer shock pivot
69 inner shock pivot
70 folding module
71 folding module connectors
72 folding frame
73 seat back frame
74 seat back extension
75 upper seatback extension flange
76 middle seatback extension flange
77 lower seat back extension flange
78 angle pin
79 angle limiting slot
80 frame connector
81 cover angle slot
82 mounting recess
83 mounting plate
84 seat back panel connector
85 cross bar tab bolt
86 mounting tab notch
87 extension opening
88 horizontal connector tab weld
89 vertical connector tab weld
90 inside frame cover
91 inside frame cover lower edge
92 inside frame cover vertical wall
93 rear strut
94 rear strut lower U-weld
95 rear panel
96 rear strut upper U-weld
97 box top panel
98 box top panel connector
101 spring to seat anchor
102 spring torsion bar anchor
103 torsion bar anchor
104 seat panel
105 seat panel anchors
106 lower seat panel anchor
107 middle seat panel anchor
108 upper seat panel anchor
110 fixed module

DETAILED DESCRIPTION OF THE PREFERRED EMBODIMENT

Figure 1:
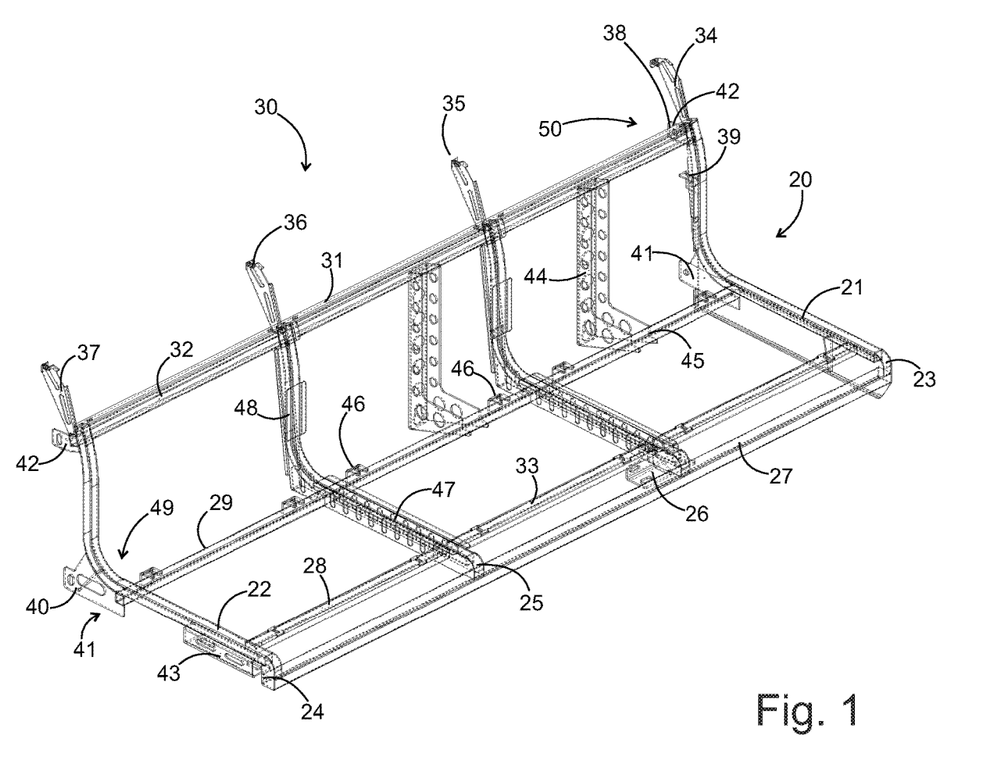
FIG. 1 is a perspective view of the fixed seat configuration.

As seen in FIG. 1, the present invention has a seat 20 with a seat frame 21. The seat frame 21 has a seat frame flange 22. The seat frame 21 has a variety of covers for covering the frame. One of the covers is a seat end cover 23 that covers an end of the seat. The seat frame 21 includes rib sections 30 formed as frame ribs. The frame ribs include a first frame rib 34, a second frame rib 35, and third frame rib 36, and a fourth frame rib 37. The frame ribs are formed with a seat nose 24. The seat nose 24 is supported at a seat nose frame bracket 26 which helps stabilize the frame rib and seat nose. The seat nose frame bracket 26 can be connected to a transit vehicle cabin such as a bus, subway or light rail train. The seat nose 24 also has a seat nose frame support 25 formed as a cross rod that can support the seat nose 24. A seat nose flange 27 provides additional rigidity for the seat nose frame support 25.

A front cross bar 28 connects the rib sections 30 into a frame. The front cross bar 28 is horizontal and longitudinal. A rear cross bar 29 is parallel to the front cross bar 28. A top crossbar 31 is also parallel to the rear crossbar 29 and the front crossbar 28. The top crossbar 31 preferably includes a top cross bar flange 32 that reinforces the top crossbar 31. The crossbar is preferably partially hollow such as by having a channel or groove formed in a crossbar hollow 33.

The frame is preferably made of steel and mounted to an interior cabin of a transit vehicle. Accordingly, the transit vehicle would also have a frame that connects to the transit bench seat frame. The upper seat frame has an upper seat frame mounting tab 42 and the lower seat frame has a lower seat frame mounting tab 41. Frame mounting tab openings 38 are formed on the upper seat frame mounting tab 42 and the lower seat frame mounting tab 41. The mid connector tab 39 is connected to a middle portion of the frame rib and also has a frame mounting tab opening 38 for connecting it to an interior cabin of a transit vehicle.

The frame also has frame connection extension 40 that extend from the rib sections 30. The frame connection extension 40 is preferably 4 mounting the seat and cover 23, but can optionally be used to mount the seat 20 to the transit vehicle frame. The frame connection extension 40 is covered by the seat end cover. The seat end cover is mounted to a seat end cover mounting tab 43.

Wall brackets 44 mount to the transit vehicle frame and directly support the frame of the seat 20. The wall brackets 44 are angle iron and can be made as angled U-shaped channels. They can have apertures for weight reduction. The wall brackets 44 have a wall bracket notch 45 that receives the rear crossbar 29 at a wall bracket lower end. The wall brackets 44 support the top crossbar 31 at a top crossbar flange 32 at a wall bracket upper end.

A plurality of cross bar tabs 46 are mounted to the front crossbar 28 and the rear crossbar 29 for connection to the plastic panels. Rib panels such as a seat rib panel 47 and a seat back rib panel 48 can be welded as plates to the frame ribs such as the third frame rib 36. The seat rib panel 47 and the seat back rib panel 48 provide a distributed support on the plastic seat panel. The frame connection extensions 40 extend away from the lower seat frame mounting tabs 41 and the lower seat frame mounting tabs 41 are mounted at the seat corners 49. An upper reinforcement area 50 reinforces the upper seat frame mounting tab 42 to the top crossbar flange 32 of the top crossbar 31.

Figure 2:
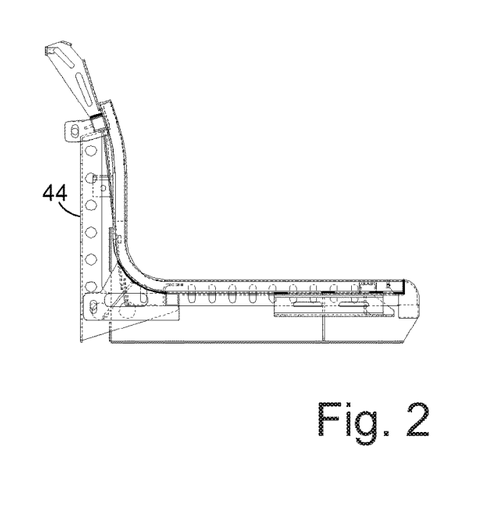
FIGS. 2-5 are side views of the fixed seat configuration.
Figure 3:
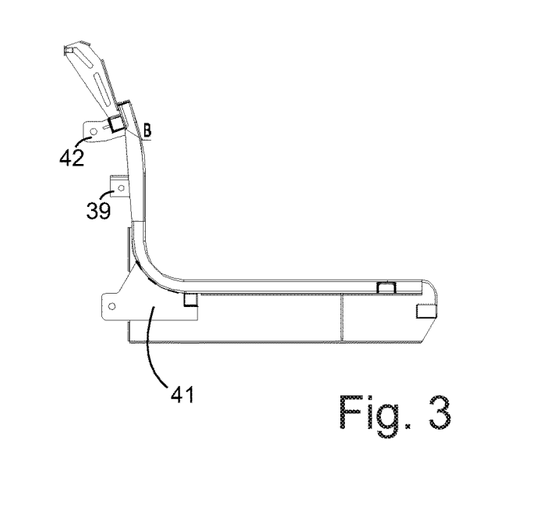

As seen in FIG. 2, a wall bracket 44 supports the seat frame. The wall bracket 44 is formed as a pair of plates extending away from transit vehicle wall. The wall bracket 44 has a lower acute angle and an upper orthogonal angle. As seen in FIG. 3, the upper seat frame mounting tab 42, the lower seat frame mounting tab 41 and the mid connector tab 39 both extend rearwardly from the rib section.

Figure 4:
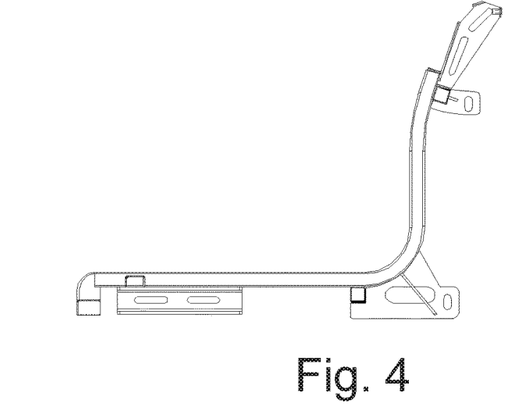
Figure 5:
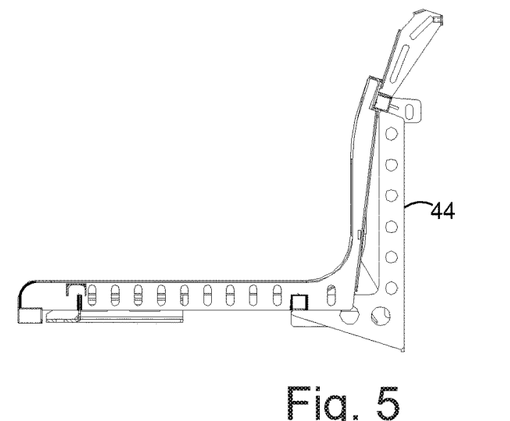

As seen in FIG. 4 and FIG. 5, the wall bracket 44 can be placed in different locations.

Figure 6:
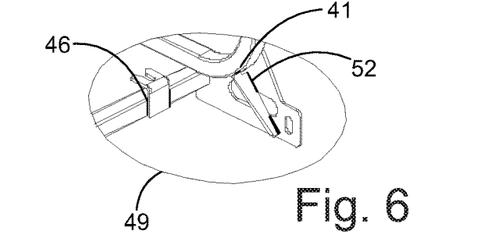
FIGS. 6-7 are detailed views of tab reinforcement webbing.

As seen in FIG. 6, the seat corner 49 has a lower frame tab webbing 52 as a reinforcement which can be a metal triangular plate that is welded to the other metal members. The lower frame tab webbing 52 can span between the lower seat frame mounting tab 41 and the seat corner 49 of the frame rib. The lower frame tab webbing 52 limits frame distortion to allow easier installation of the plastic seat panel to the cross bar tab 46.

Figure 7:
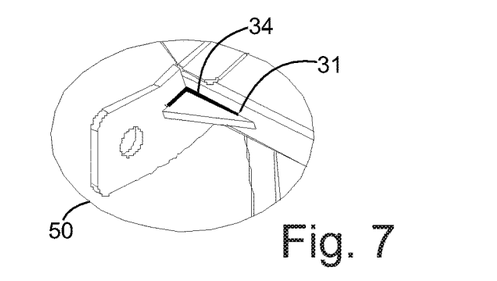
Figure 8:
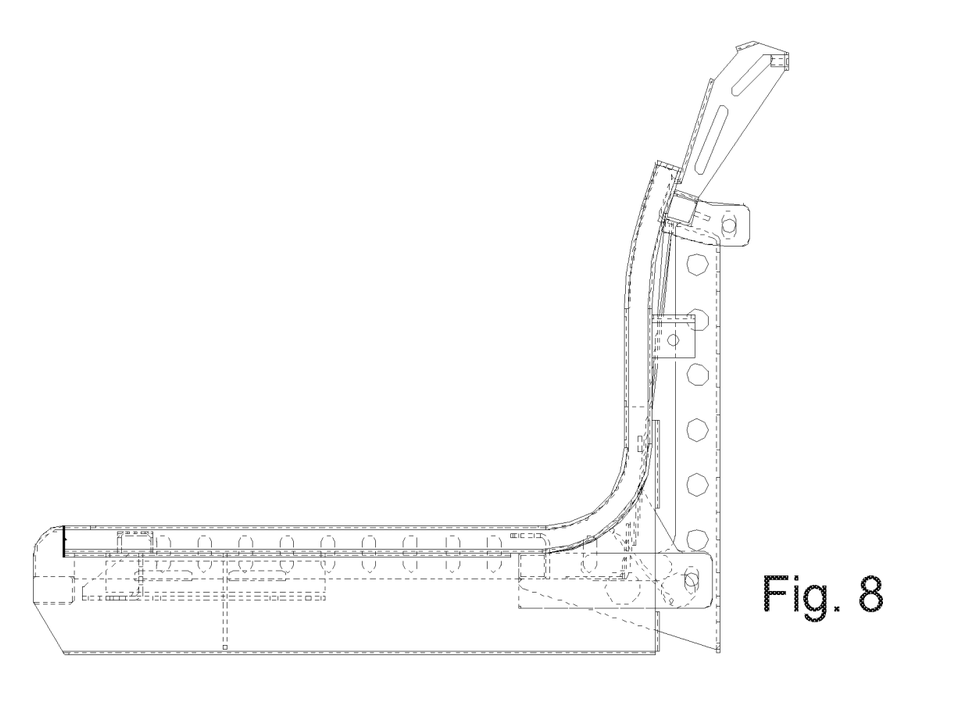
FIGS. 8-9 are side views of the fixed seat configuration showing position of the wall bracket.
Figure 9:
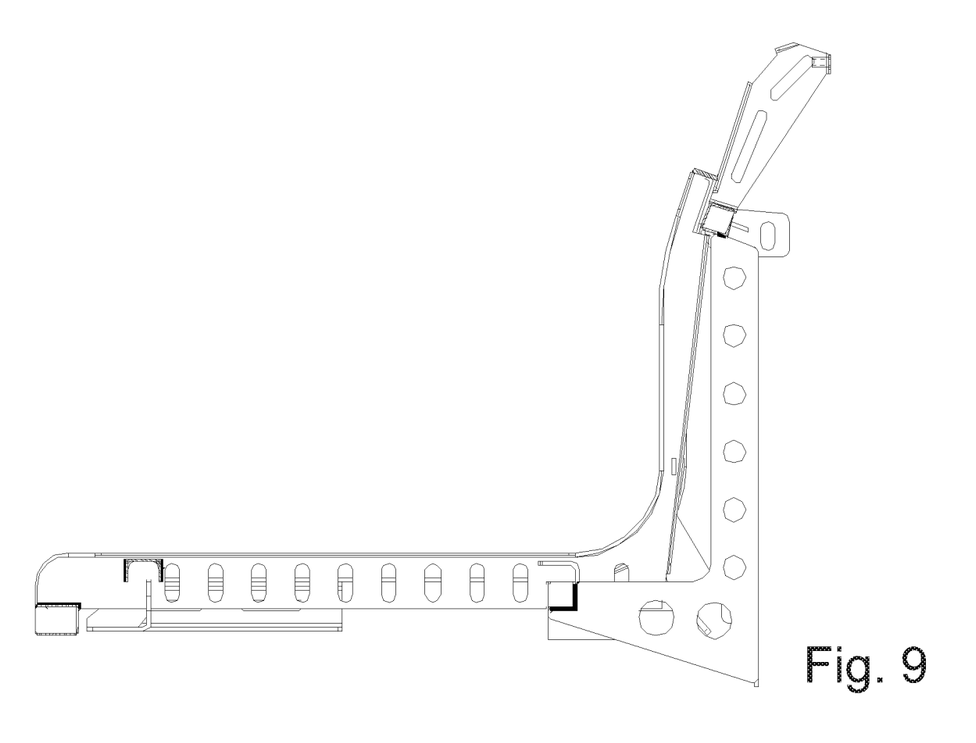
Figure 10:
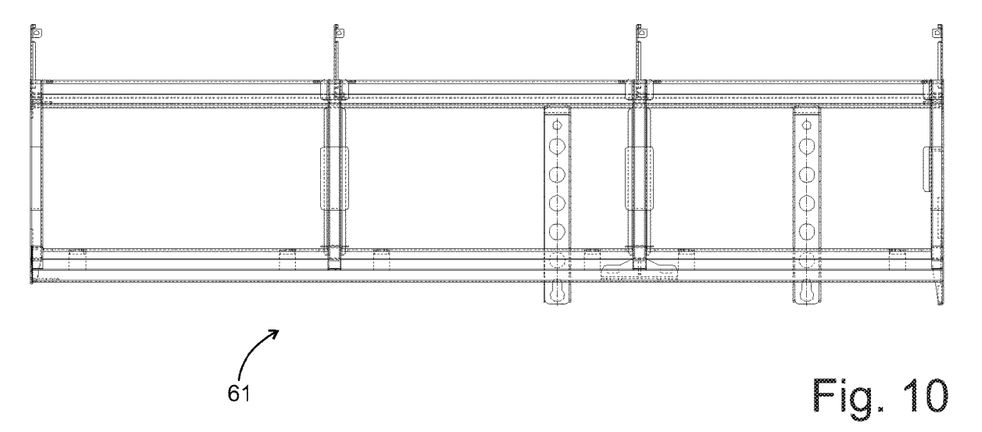
FIG. 10 is a front view of the fixed seat configuration.
Figure 11:
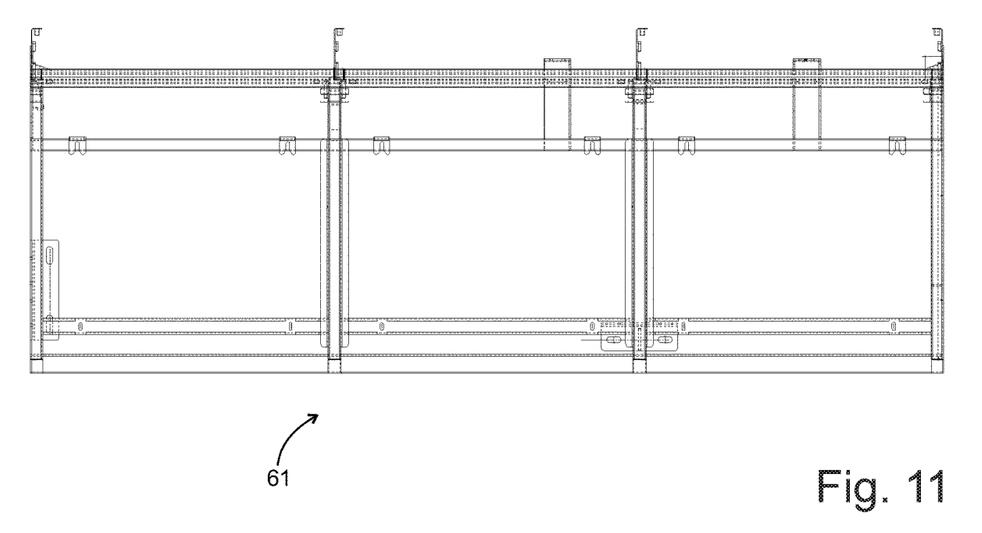
FIG. 11 is a top view of the fixed seat configuration.

As seen in FIG. 7, the top crossbar 31 and the first frame rib 34 are oriented at a right angle at an upper reinforcement area 50. The triangular-shaped upper frame tab webbing 51 can be welded to extend between the top crossbar 31 and the first frame rib 34

As seen in FIGS. 8-11, the transit bench seat is formed in models including a fixed module 61 that does not have folding seats.

Figure 12:
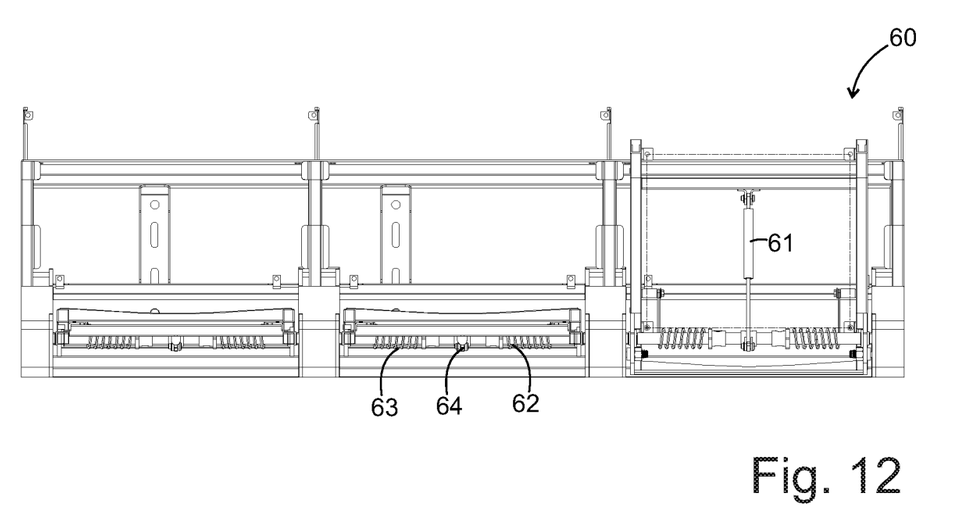
FIG. 12 is a front view of the folding seat configuration.

As seen in FIG. 12, a folding module 60 has folding seats that are motion controlled by the connected to a shock 61. The front portion of the folding seat is connected to the front portion of the shock 61 and the rear portion of the shock 61 is connected to a shock on 65 that is in turn connected to the torsion bar 64. The shock 61 controls the rotation of the torsion bar 64. The torsion bar 64 is rotationally mounted to the seat frame. The torsion bar 64 has a right torsion spring 62 wrapped around a right side of the torsion bar 64 and a left torsion spring 63 wrapped around a left side of the torsion bar 64.

Figure 13:
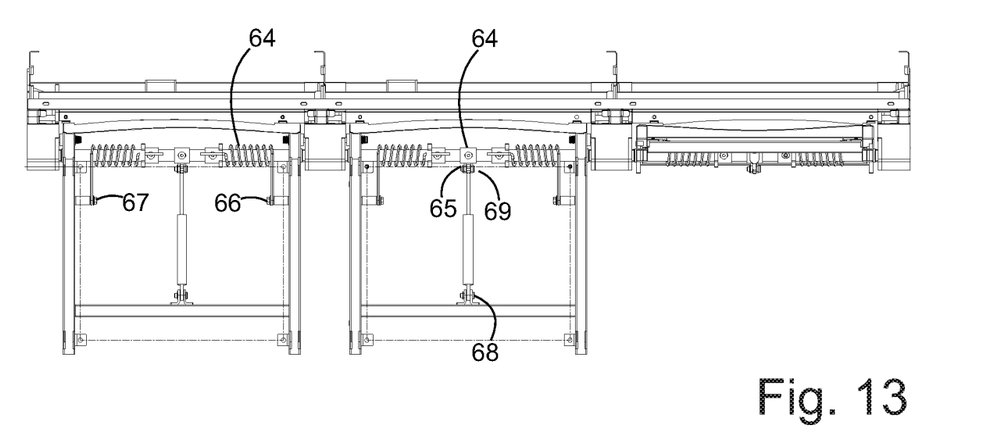
FIG. 13 is a top view of the folding seat configuration.

As seen in FIG. 13, the torsion bar 64 is coaxial with the torsion springs. The shock arm 65 can raise one or more seats simultaneously. For example, when a user is not using the seat, the seat can slowly rise to a vertical position to allow handicapped persons to use the floor space. The right torsion spring 62 is connected to a right torsion spring mount and the left torsion spring 63 is connected to the left torsion spring mount 67. The shock 61 is pivotally mounted to the folding seat frame at an outer shock pivot 68. The shock arm is pivotally mounted to the shock on 65 at an inner shock pivot 69.

Figures 14, 15, 16:
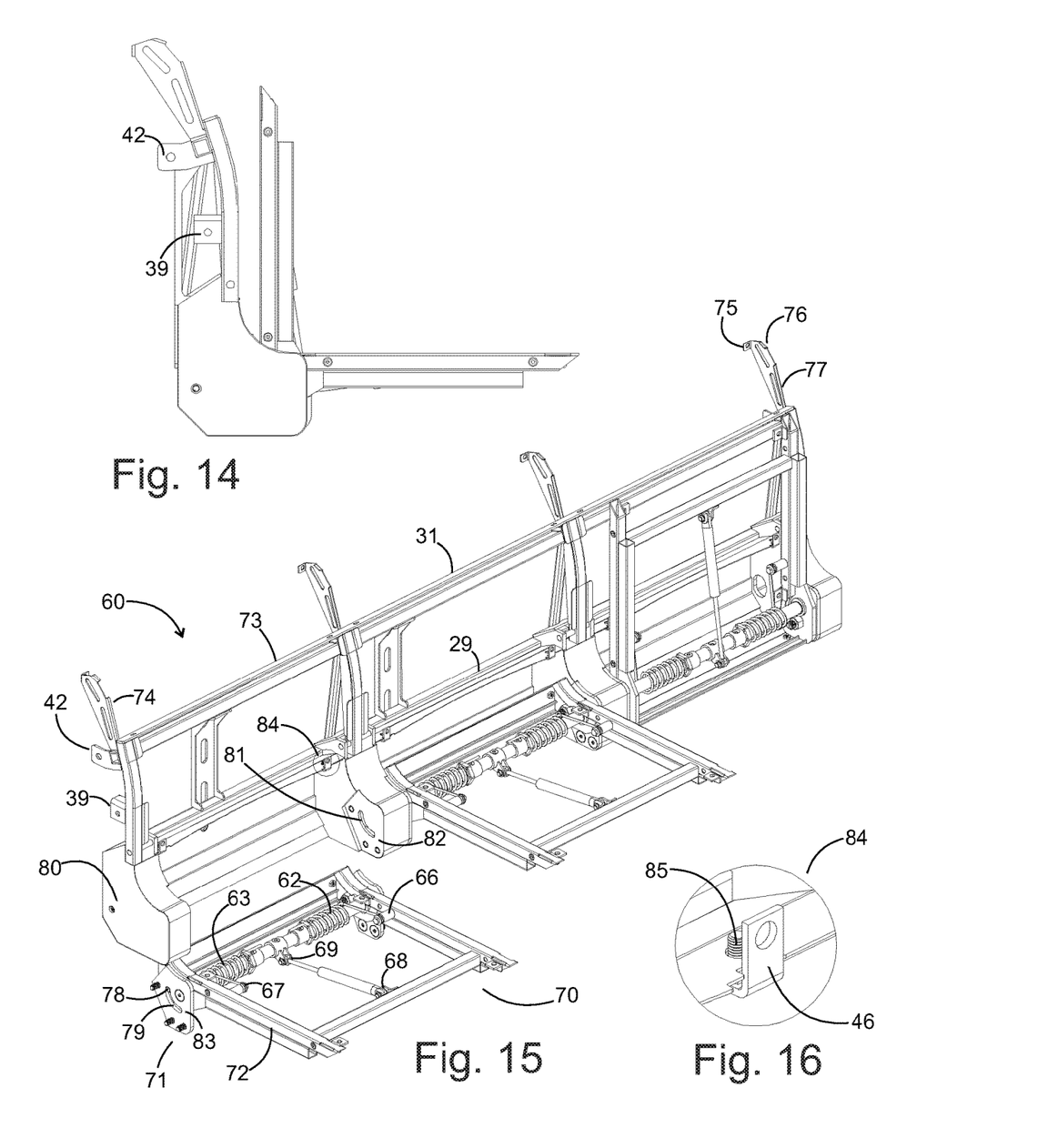
FIG. 14 is a side view of the folding seat configuration.
FIG. 15 is a perspective exploded view of the folding seat configuration.
FIG. 16 is a detailed view.

As seen in FIG. 14, the mid connector tab 39 and the upper seat frame mounting tab 42 provide support the pivoting seat additional rigidity.

As seen in FIG. 15, folding module 60 has a seat back frame 73 which has a seat back extension 74 that has an upper seatback extension flange 75, a middle seatback extension flange 76, and a lower seat back extension flange 77. The rear crossbar 29 is horizontal and below the seatback frame.

As seen on the folding module 70, the folding frame 72 folds from an upright stowed position to a horizontal deployed position. The inner shock pivot 69 of the shock is between the right torsion spring 62 and the left torsion spring 63. The outer shock pivot 68 has a connection to the folding frame 72. The inner shock pivot 69 has a connection to the shock arm 65. In this way, the seat can be configured to automatically raise when unoccupied, or stay raised or stay lowered. The right torsion spring mount 66 and the left torsion spring mount 67 are both connected to the folding frame 72. The folding module 70 is connected in a modular fashion by folding module connectors 71. The frame cover 80 is mounted to a lower portion of the seatback frame 73. The folding module connectors 71 connect the mounting plate 83 to the mounting recess 82. The mounting recess 82 preferably has a cover angle slot 81 which receives an angle pin 78 of the mounting plate 83. The cover angle slot 81 matches the angle limiting slot 79 so that the angle pin 70 travels through both and limits the angle of the folding frame 72 between the upright and deployed positions.

Figures 17, 18, 19, 20:
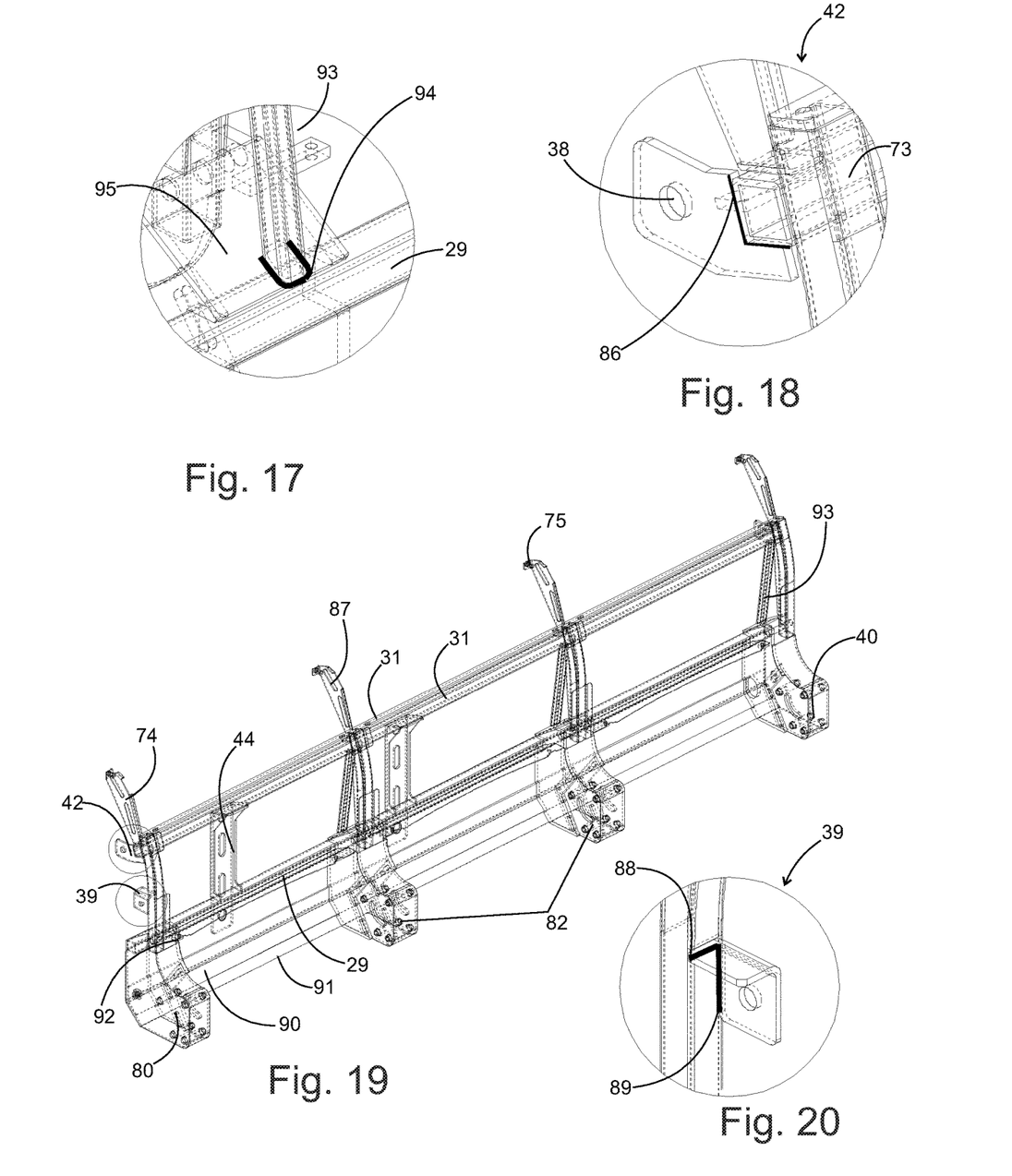
FIG. 17 is a detailed view of welding structure.
FIG. 18 is a detailed view of welding structure.
FIG. 19 is a perspective view of the seat frame without the folding frame.
FIG. 20 is a detailed view of welding structure.

As seen in FIG. 16, the seat back panel connector 84 preferably includes a cross bar tab 46 retained by a cross bar tab bolt 85. As seen in FIG. 17, the rear cross bar 29 supports a rear panel 95, and the rear panel 95 is connected to the rear strut 93 at a rear strut lower U-weld 94.

As seen in FIG. 18, upper seat frame mounting tab 42 has a mounting tab notch 86 receiving a crossbar of a seat back frame 73.

As seen in FIG. 19, the rear strut 93 connects the rear crossbar 29 to the top crossbar 31. The seat back extension 74 has an extension opening 87 near the upper seatback extension flange 75. The frame cover 80 may further include an inside frame cover 90 having an inside frame cover lower edge 91.

As seen in FIG. 20, a horizontal connector tab weld 88 can meet a vertical connector tab weld 89 for reinforcing the connector tab.

Figure 21:
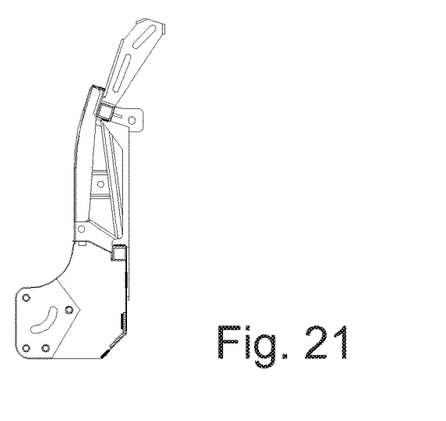
FIG. 21 is a side view of the seat frame.
Figure 22:
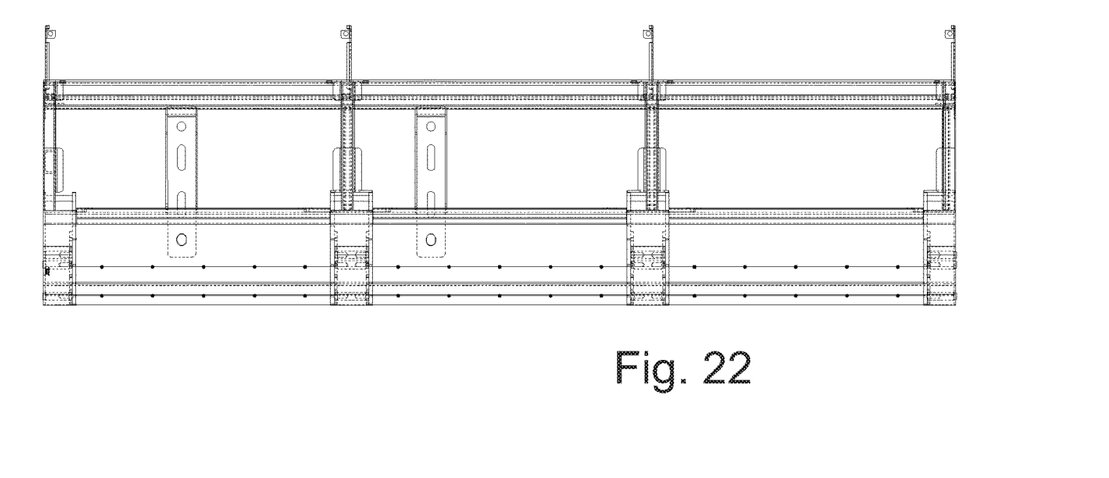
FIG. 22 is a front view of the seat frame.
Figure 23:
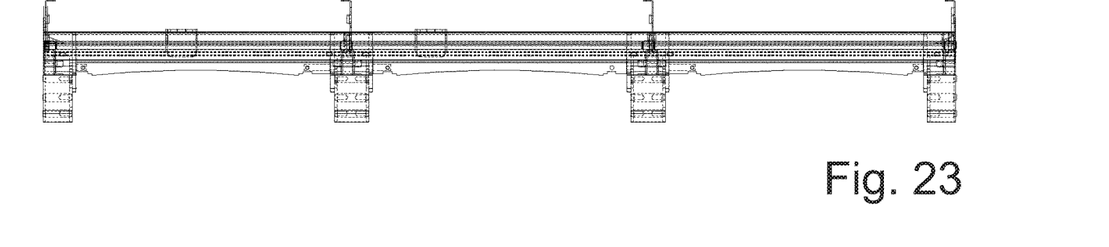
FIG. 23 is a top view of the seat frame.

As seen in FIGS. 21-23 the folding seat module can be mounted separately from the seat portions, before the seat portions are mounted to the folding seat module.

Figures 24, 25, 26:
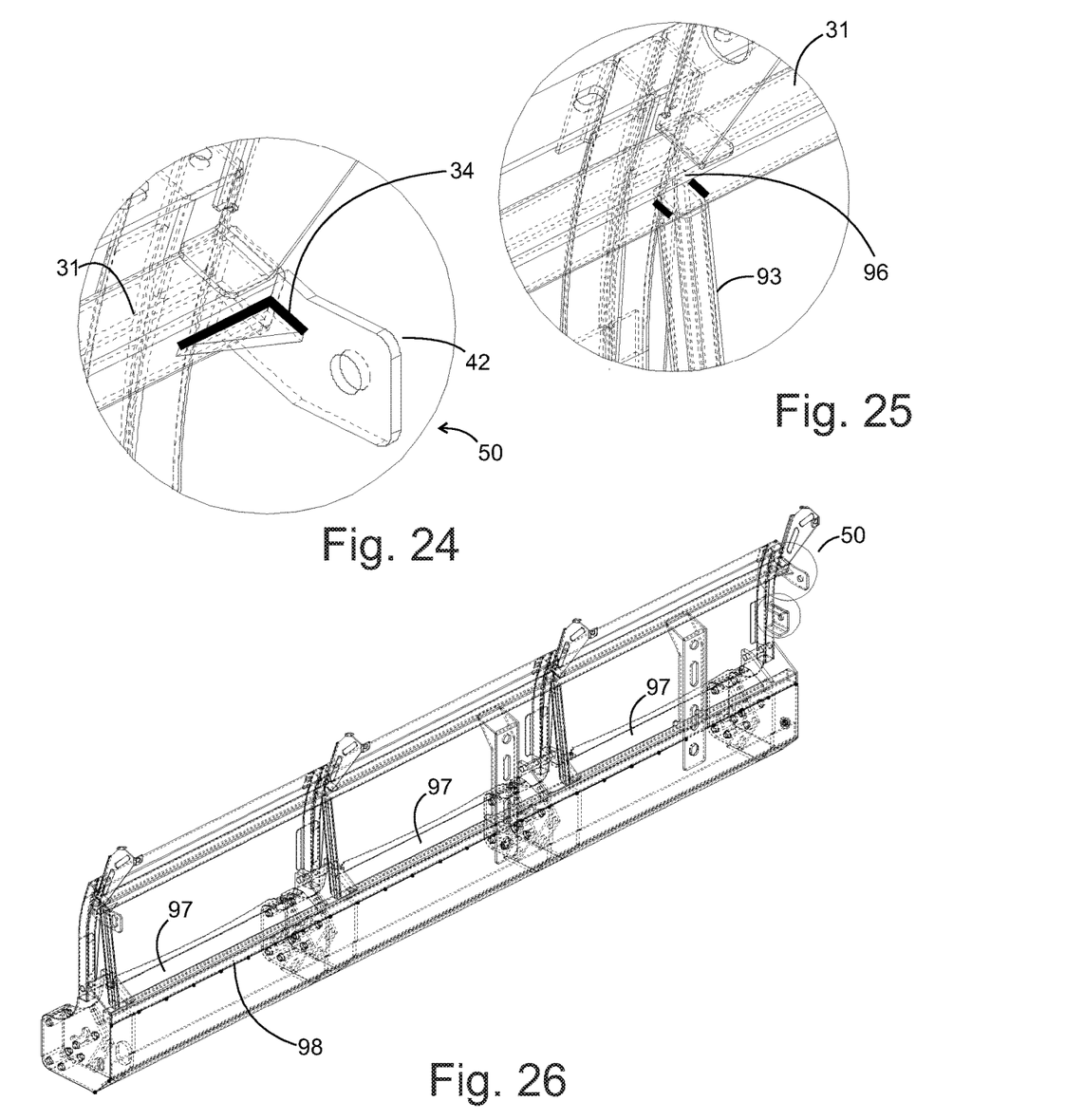
FIG. 24-25 are detailed views of the welding structure.
FIG. 26 is a rear perspective view of the seat frame.
Figure 27:
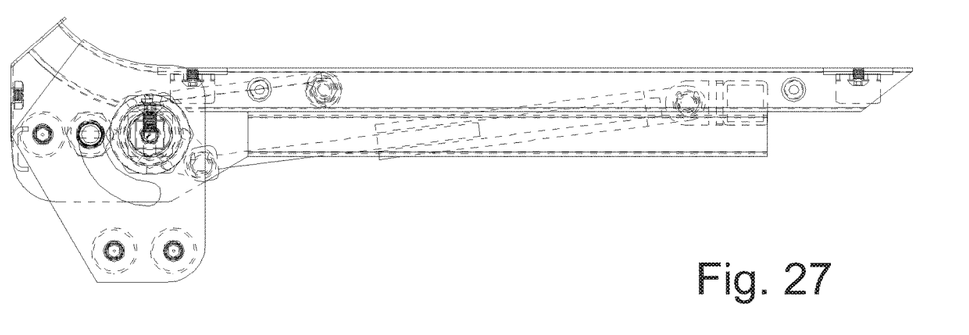
FIG. 27 is a side view of the folding frame.
Figure 28:
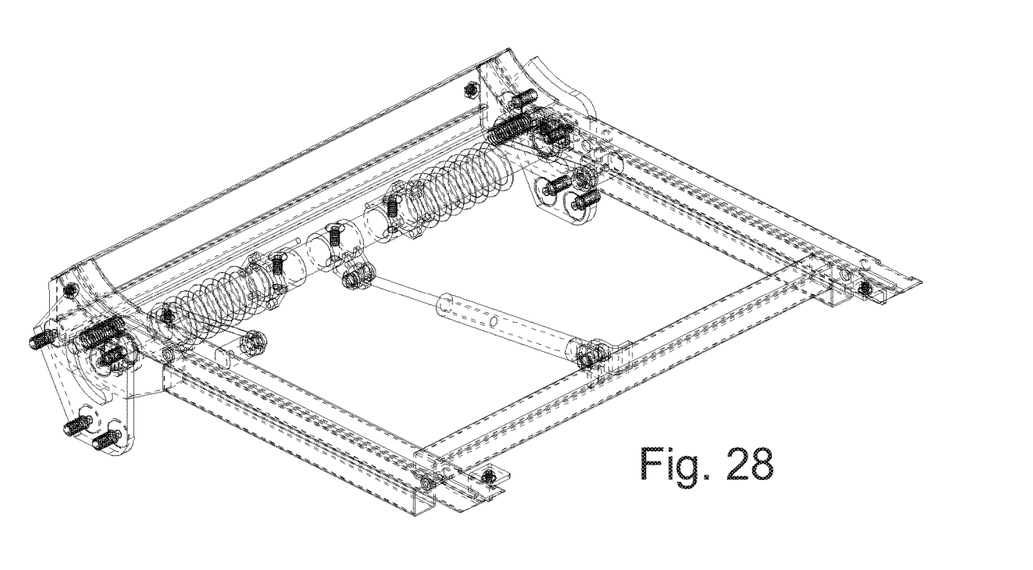
FIG. 28 is a perspective view of the folding frame.

As seen in FIG. 24, an upper reinforcement area 50 shows where the first frame rib 34 is welded as a trainer plate or sheet of metal webbing across the top crossbar 31 and upper seat frame mounting tab 42.

As seen in FIG. 25, the top crossbar 31 is welded to the rear strut 93 by a pair of welds or a rear strut upper U-weld 96.

As seen in FIG. 26, the upper reinforcement area 50 is the highest reinforcement area. The box top panel 97 is a frame cover held by a box top panel connector 98.

Figure 29:
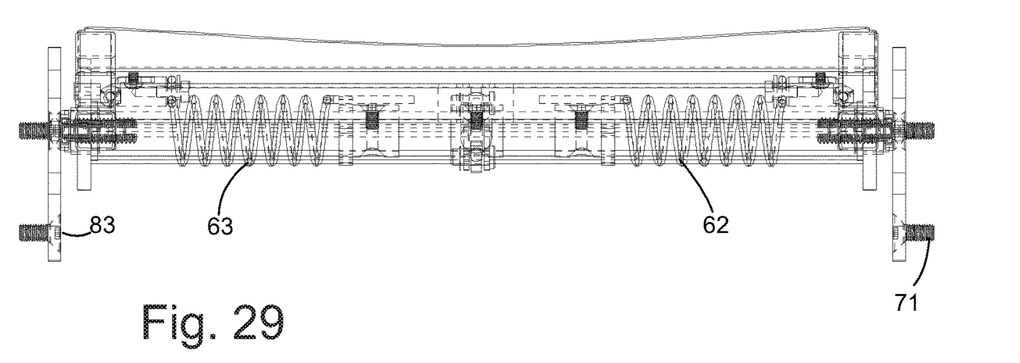
FIG. 29 is a front view of the folding frame.
Figure 30:
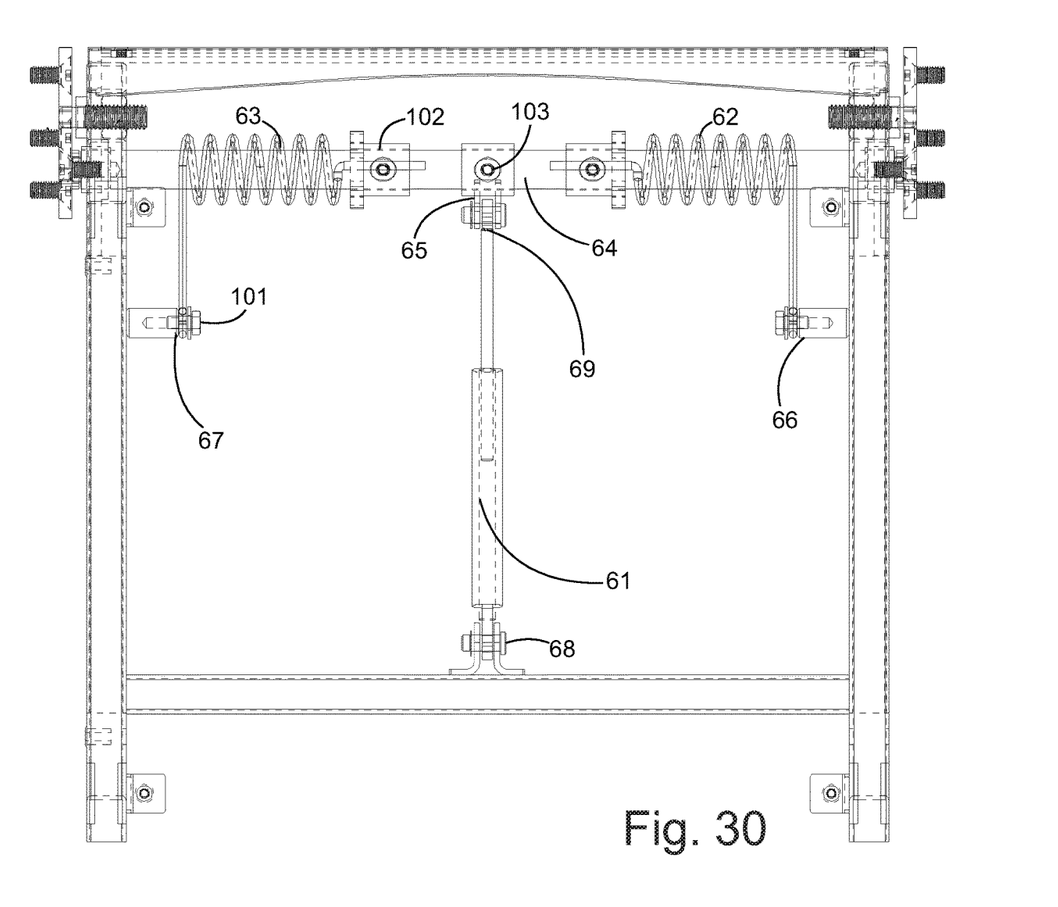
FIG. 30 is a top view of the folding frame.

FIGS. 27-30 show the detail of the seat frame mechanism. As seen in FIG. 29, a right torsion spring 62 and a left torsion spring 63 are mounted parallel to each other and parallel to folding module connectors 71 which are orthogonal to a mounting plate 83. As seen in FIG. 30, the shock 61 is a telescopic member that dampens movement. The shock 61 can be hydraulic or pneumatic. The shock 61 dampens the force of the right torsion spring 62 and the left torsion spring 63 helically mounted around the torsion bar 64. The right torsion spring mount 66 and the left torsion spring mount 67 mount the extending tips of the torsion springs. The outer shock pivot 68 pivotally connects the shock to the seat frame and the inner shock pivot 69 pivotally connects the shop to the torsion bar. The torsion bar has a torsion bar anchor 103. The torsion springs are mounted to the torsion bar at the spring torsion bar anchor 102. The right torsion spring mount 66 and the left torsion spring mount 67 have a spring to seat anchor 101 such as a bolt connecting to a cylindrical metal extension.

Figure 31:
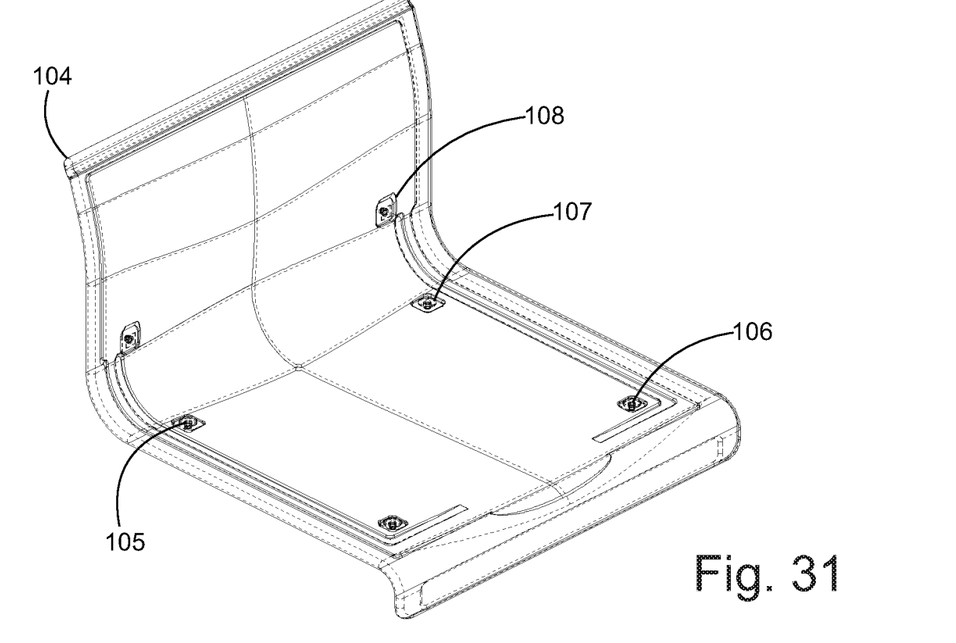
FIG. 31 is a perspective view of the fixed seat panel.
Figure 32:
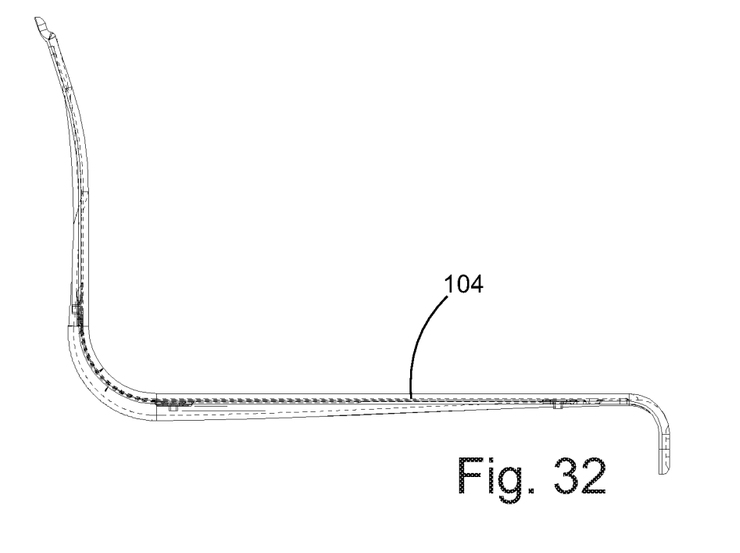
FIG. 32 is a side view of the fixed seat panel.

As seen in FIG. 31, the seat panel 104 is preferably formed of a plastic or composite material, although the seat could also be made of metal. The seat panel anchors 105 includes the lower seat panel anchor 106, the middle seat panel anchor 107, and the upper seat panel anchor 108. As seen in FIG. 32, the seat panel 104 has a curved middle with horizontal and straight left and right edges.

The invention claimed is:

1. A transit bench seat comprising:
   a. a seat with a seat frame, wherein the seat frame is connected to a folding frame that folds between an upright stowed position and a horizontal deployed position;
   b. a seat frame cover, wherein the seat frame cover covers the left or right end of the seat frame;
   c. a plurality of rib sections formed as frame ribs, wherein the frame ribs include a first frame rib, a second frame rib, and third frame rib;
   d. wherein the frame ribs are formed with a seat nose, wherein the seat nose is supported at a seat nose frame bracket for stability of the frame rib and seat nose;
   e. a rear cross bar placed below a top crossbar, wherein the rear crossbar and the top crossbar are connected to the frame ribs;
   f. a pair of torsion springs including a right torsion spring and a left torsion spring are helically mounted around a torsion bar, wherein the torsion bar is rotationally mounted to the seat frame;
   g. a torsion arm rigidly connected to the torsion bar, wherein the torsion arm extends away from the torsion bar, wherein the torsion bar has a torsion bar anchor, wherein the pair of torsion spring are mounted to the torsion bar at the torsion bar anchor; and
   h. a shock pivotally connected to the torsion arm, and pivotally connected to the folding frame, wherein the shock is mounted at an inner shock pivot to the torsion arm, and wherein the shock is mounted to the folding frame at an outer shock pivot, whereby the seat can be configured to automatically fold to the upright stowed position when unoccupied.

2. The transit bench seat of claim 1, further including:
   a. folding module connectors, wherein the folding module connectors connect the folding frame to the seat frame, wherein the folding frame is modularly detachable,
   b. wherein the shock is a telescopic member that dampens movement, wherein the shock is hydraulic or pneumatic, wherein the shock dampens the movement due to the force of the right torsion spring and the left torsion spring helically mounted around the torsion bar, wherein the right torsion spring mount and the left torsion spring mount retain extending tips of the torsion springs to the forming frame;
   wherein the outer shock pivot pivotally connects the shock to the seat frame and the inner shock pivot pivotally connects the shock to the torsion bar.

3. The transit bench seat of claim 2, further including: wherein the folding module connectors connect the mounting plate to the mounting recess, wherein the mounting recess on the seat frame has a cover angle slot which receives an angle pin of the mounting plate, wherein the cover angle slot on the seat frame matches an angle limiting slot on the mounting plate, so that the angle pin travels through both the cover angle slot and the angle limiting slot to limit a travel angle of the folding frame between the upright and the deployed position.

* * * * *